(12) United States Patent
Han et al.

(10) Patent No.: US 9,990,374 B2
(45) Date of Patent: Jun. 5, 2018

(54) SPATIAL ANALYTICS EXTENSIONS

(71) Applicants: Qiang Han, Vancouver (CA); Alexei Potiagalov, Richmond (CA)

(72) Inventors: Qiang Han, Vancouver (CA); Alexei Potiagalov, Richmond (CA)

(73) Assignee: Business Objects Software Limited, Dublin (IE)

( * ) Notice: Subject to any disclaimer, the term of this patent is extended or adjusted under 35 U.S.C. 154(b) by 343 days.

(21) Appl. No.: 14/522,204

(22) Filed: Oct. 23, 2014

(65) Prior Publication Data

US 2016/0117346 A1 Apr. 28, 2016

(51) Int. Cl.
*G06F 17/30* (2006.01)

(52) U.S. Cl.
CPC .. *G06F 17/30241* (2013.01); *G06F 17/30259* (2013.01); *G06F 17/30528* (2013.01); *G06F 17/30592* (2013.01)

(58) Field of Classification Search
CPC ............ G06G 17/30241; G06F 17/3087
See application file for complete search history.

(56) References Cited

U.S. PATENT DOCUMENTS

| 2003/0023586 A1* | 1/2003 | Knorr | G06F 17/3087 |
| 2003/0036848 A1* | 2/2003 | Sheha | G01C 21/3679 701/468 |
| 2007/0130172 A1* | 6/2007 | Lee | G06F 17/30241 |

* cited by examiner

*Primary Examiner* — Hung Q Pham
(74) *Attorney, Agent, or Firm* — Mintz Levin Cohn Ferris Glovsky and Popeo, P.C.

(57) ABSTRACT

Methods and apparatus, including computer program products, are provided for spatial analytics. The method may include generating a query including spatial context information, the query structured to include a predicate for the query and the spatial context information, the spatial context information including at least one of feature information or geometric information; and sending the query to a spatial query processor including a database in order to generate a query response in accordance with the predicate and spatial context information. Related systems, methods, and articles of manufacture are also disclosed.

15 Claims, 4 Drawing Sheets

400

GENERATING A QUERY INCLUDING SPATIAL CONTEXT INFORMATION 405

SENDING THE QUERY TO A DATABASE IN ORDER TO GENERATE A QUERY RESPONSE IN ACCORDANCE WITH THE PREDICATE AND SPATIAL CONTEXT INFORMATION ___

RECEIVING A QUERY RESULT 415

SPATIAL ANALYTICS EXTENSIONS

FIELD

The subject matter described herein generally relates to data processing.

BACKGROUND

Location-based services are becoming increasingly important to businesses. For example, knowing the location of a business, such as a restaurant, or the location of a customer may be useful to analytics. However, the handling of location information may not address the needs of analytical processing used in complex databases today.

SUMMARY

Methods and apparatus, including computer program products, are provided for spatial analytics.

In one aspect, there may be provided a method, which may include generating a query including spatial context information, the query structured to include a predicate for the query and the spatial context information, the spatial context information including at least one of feature information or geometric information; and sending the query to a spatial query processor including a database in order to generate a query response in accordance with the predicate and spatial context information.

In some example embodiments, one of more variations may be made as well as described in the detailed description below and/or as described in the following features. The feature information may include at least one term. The at least one term may explicitly identify a location. The feature information may identify at least one of an administrative boundary, a political boundary, a continent, a country, a state, a province, a county, a city, and a road name, a body of water, a river, a landmark, a pipe line, or a power grid. The geometric information may include at least one of a geometric shape, three-dimensional information, a spatial location, a distance, a relative distance, or a direction. The query may include a plurality of spatial context information stacked within the query. The database may include at least one of a relational database or a multidimensional database. The spatial context information query may be selected from the user interface. The spatial context information may include the feature information and the geometric information. The feature information may include a geographical feature. It is to be understood that both the foregoing general description and the following detailed description are exemplary and explanatory only and are not restrictive. The method may also include forming a structure including the predicate for the query and the spatial context information including the feature information and the geometric information, wherein the generating further includes generating the query including the formed structure Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Location information can be included in business information in a variety of ways. For example, the location may be a word or a phrase with an implicit geographic meaning, such as Vancouver, Yaletown, or Wall Street, or the location may be a more explicit location defining a more precise location, such as latitude, longitude, and/or other coordinate-based methods. When data is ready to be analyzed and visualized, human-centric terms can be translated into geometry to support data modeling and analytical processing-based aggregations including statistical analysis.

The subject matter disclosed herein may provide a query that includes one or more extensions for spatial analytics. The spatial analytics extension may include spatial information and may comprise a domain specific language extension to an analytical query. For example, a query, such as an analytical query, may be sent from a user interface to for example, a backend server, such as a business intelligence system, a database, a relational database, and/or a multidimensional database. This analytical query may be extended to include spatial information. The spatial extension may incorporate spatial concepts, as a first-class concept, into the analysis process at the same level, or prior to, the predicates, features, or other values (for example, mark types, color, size, and the like).

The spatial extension may enrich a business intelligence (BI) data model with additional spatial information and hierarchies. This includes the ability to join in on-the-fly new dimensions or hierarchies. The spatial extension may also enable the BI query model to use spatial information and hierarchies in filtering and grouping as well as the ability for other elements of the query to refer to spatial information. In addition, the spatial extension may extend the BI query model with spatial binning (space partitioning). The spatial BI query model enables application developers to create queries that use geographical features (e.g., administrative, water, police wards) to filter and aggregate data of a given application. Furthermore, the spatial extension may enable the creation of spatial domain specific queries in an intuitive way. For example, spatial conditions may be expressed at a user interface in an intuitive way and translated into series of spatial and analytic computation steps to deliver the results back to the user.

Figure 1:
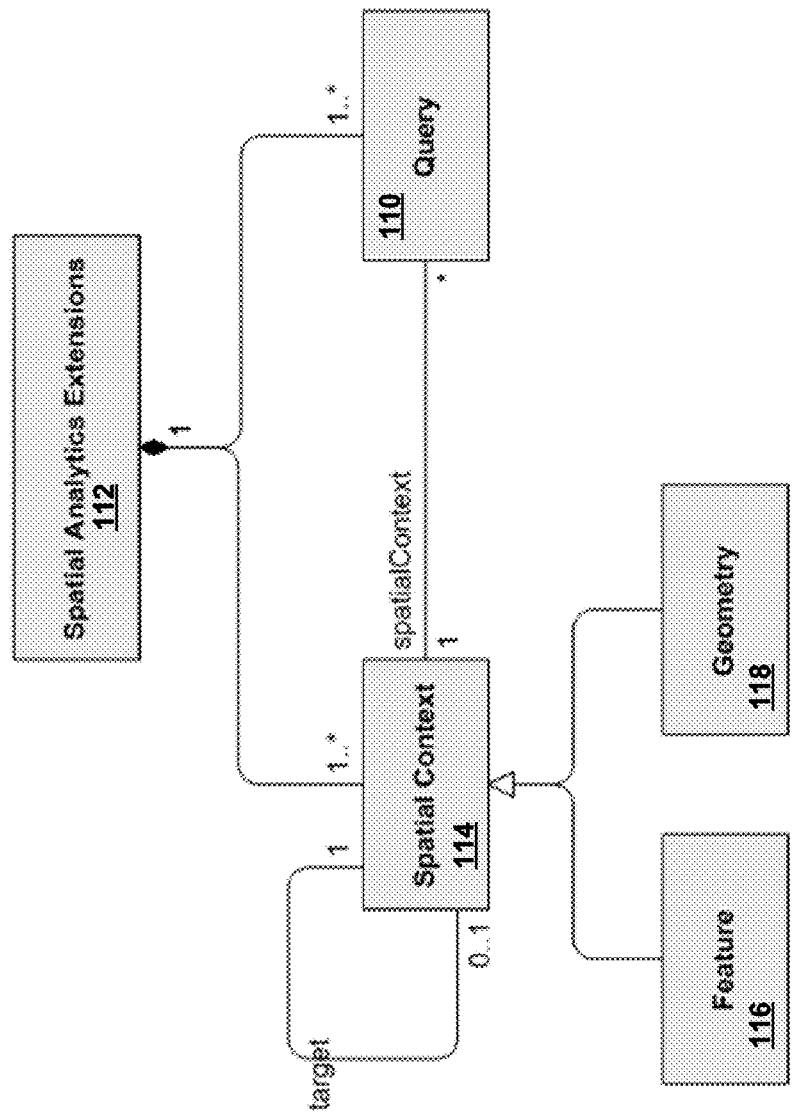
FIG. 1 illustrates a block diagram of a query structure including spatial context, in accordance with some example implementations.

FIG. 1 depicts an element model of a query 110 extended with spatial extensions 112 (also referred to herein as a spatial analytics extensions). The spatial extensions 112 include spatial context information 114, which further includes feature information 116 and/or geometry information 118.

To illustrate, spatial context information may be generated or selected to include location information, topologic information, geometric information, and/or other associated location semantics. The spatial information may then be used to define spatial context 114. The analytical query 110 may be formed, and the formed analytical query may be extended to include the spatial context 114. In some example embodiments, the analytical query 110 has a specific structure for spatial context 114. When the analytical query 110 is sent to a spatial processor including a database for example, the database can process the query 110 including the spatial context 114 in order to yield a query result based on the spatial context.

Figure 2:
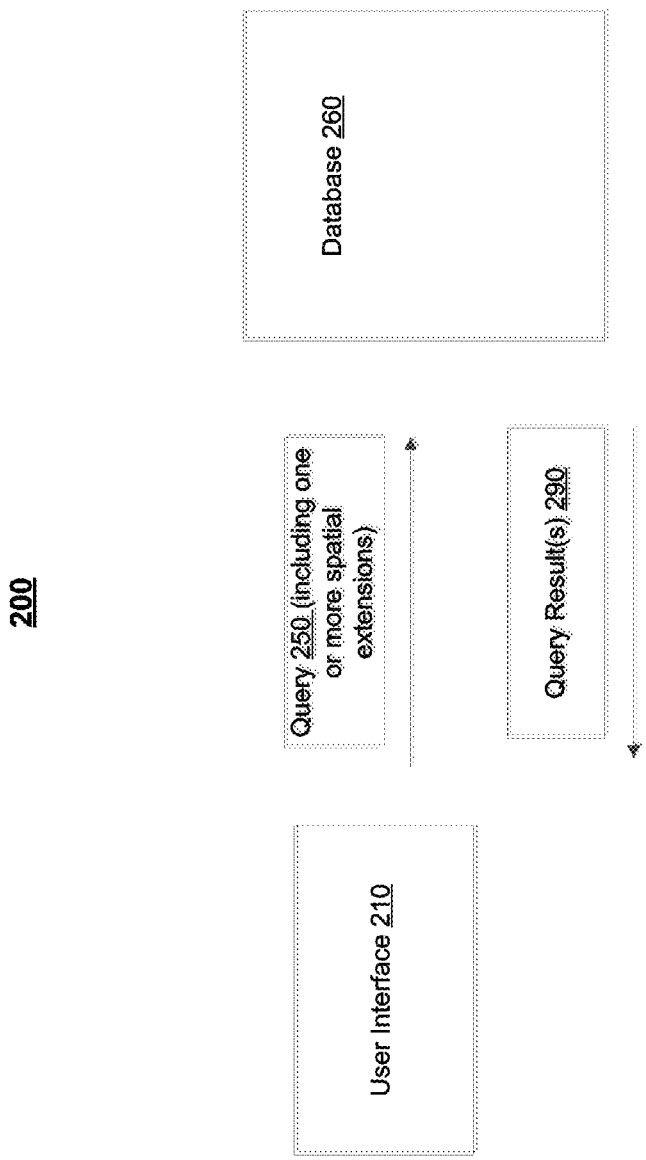
FIG. 2 illustrates a system block diagram including a query containing spatial context, in accordance with some example implementations.

FIG. 2 depicts an example of a system 200 including a user interface 210 and a database 260. The user interface may be implemented as a browser and/or other application, and the user interface may allow generation or creation of a query. Moreover, the query may include spatial context information. For example, an analytical query may be formed to list customers near "Yaletown." In this example, query 250 may include a query to select "customers" and a spatial extension "near Yaletown." To illustrate further, the user interface may be used to select or input the "Yaletown" Business Improvement Association, sales summary per location, and sales summary for each cell of a virtual grid.

The database 260 may then receive query 250 and select, based on the value or predicate "customers," from database 260, and this selection may include additional analytics that further filters the list of customers to those "near Yaletown." Moreover, database 260 may include geographic information to enable this query. In response, database 260 sends to user interface 210 query results 260 including a list of customers near the Yaletown.

Although FIG. 2 depicts a user interface sending the query, other applications including a web service may send the query as well. Moreover, the query may be sent to a spatial processor, which may be coupled to the database. For example, a web service may receive a spatial query and then access a coupled database to handle operations such as filtering and the like.

In the previous Yaletown example, the geometric information "nearby" may be assigned a value in for example a query model, so that the database 260 determines a specific region for nearby. For example, the bounds of "nearby" may be pre-assigned/defined before the query, or selectable via the user interface.

The spatial extension of query 250 may include feature information 116. Feature information may include spatial context information, which may exist without for example any pre-modeled effort in the business data as feature information 116 naturally includes spatial context information. For example, administrative or political boundaries, such as a continent, a country, a state, a province, a region, a county, a city, a road name, a body of water, a river, a pipe line, a power grid, and the like, are all examples of feature information 116 as these data types naturally provide spatial context.

Moreover, the feature information 116 may include a functional component. The functional component is a part of natural hierarchies (for example, rooms or floors in a hotel) existing among the building blocks. For example, a user might want to analyze mini-bar sales by rooms or floors. The spatial extension of query 250 may include geometry information 118.

Geometry information 118 may represent a geometric or positionally based spatial context. For example, geometry information 118 may comprise geometrical shapes, such as points, polygons, two-dimensional information (for example, longitude and latitude), three-dimensional information (for example, longitude, latitude, and height), spatial location, and/or a location in some type of coordinate systems (for example, location x, y, z in a given spatial reference system, which may serve as a default coordinate system). The geometry information 118 may also include distance and/or relative distance (for example, at, nearby, within a region bounded by, and/or the like) and direction (for example, North of, right of, behind, in front of, and/or the like). The geometry information 118 may access a data model to represent a feature or collection of features. The geometry information 118 may also take into account topology, which may be in accordance with a topology model such as dimensionally extended nine-intersection model (DE-9IM) and the like. In the example of FIG. 2, the "nearby" Yaletown" may be assigned a value, such as within a bounded region or radius of a certain distance. This assignment of value may be defined as a spatial context to enable query generation at UI 210.

Although the query 250 may be any type of query, in some implementations, the query 250 may comprise an analytic query, examples of which include a multidimensional database query, a relational database query, and/or the like. Moreover, the analytic query may have a structure. This structure may conform to a query language. In addition, the query structure may provide a single query that includes the analytical query and the spatial context (which may further include the feature information 116 and/or the geometry information 118). The spatial context may be defined as a set of assigned spatial operations. An example of a defined spatial context is depicted in Table 1 below.

TABLE 1

| Line No. | Query |
|---|---|
| 1. | Spatial Context = |
| 2. | ([Feature] <filter \| hierarchy \| group>, Spatial Reference System) |
| 3. | |
| 4. | or |
| 5. | ([Geometry] |
| 6. | <Location Op - center \| sample \| ... \|, |
| 7. | Geometry Op - buffer \| area \| partition \| ... \|, |
| 8. | Topology Op - touches \| within \| contain\| ... \|, |
| 9. | Distance Op - at \| nearby \| range of \| ... \|, |
| 10. | Direction Op - North, East, West, South>, |
| 11. | [Feature], Spatial Reference System) |

In the example of Table 1, the spatial context may include feature information 116 (line 2), pure geometry (line 5), and geometric operations, such as topological operation (line 8), a distance (line 9), a direction (line 10), and/or an indication of the spatial reference system (line 11). For example, a topological operator has parameters, which could be spatial contexts (e.g., features, geometries, operators, and the like).

The spatial context may be defined as recursive. The defined spatial context may allow selection of a feature, such as a location, and/or a geographic operator (topological, space partitioning, direction, and the like). The defined spatial context may also be used for selection and grouping of a set of features into a data set for navigation and aggregation. For example, a user can select parks, recreation centers, community centers, public libraries, into a user interface element mapped to "Feature" in order to do an aggregation based on a new set of selected features. Alternatively or additionally, a user can select a park for example, in which case the park can be used as a "Feature" based filter when making a query for a selection.

The geometry 118 may also enable users to select (via for example a select or drawing a shape on a map) a geometrical shape, such as a point, a line, a polygon, a multi-point line, and/or the like. Moreover, a buffer, an area, a partition, a topology, a distance, or a direction may be defined in a spatial context as well. Combining a collection of geometries with feature filtering may be used to apply a topology operation or to create a buffer. For example, a query for "highlight a 50-meter boundary around all lakes" may be defined using a spatial context defining a 50-meter area around the "Feature" lake. If a given feature is selected at a user interface, the associated geometries of the selected feature may be calculated using the geometry field having the 50-meter boundary. For example, if the geometric feature "Parks" is selected, then all the Parks are selected in a query, and a created buffer formed around each Park is calculated. This may then be used to filter all points spatially located inside these selected Parks buffer areas.

In some example implementations, the query syntax may be in accordance with JavaScript Object notation (JSON). Specifically, the query 250 from user interface 210 to the backend database 260 may be in accordance with JSON, although other languages. For example, to select a crosstab of product sales for the years 2012 and 2013 for all stores closer than 500 meters to a park or recreational center, the query of Table 2 may be generated.

TABLE 2

| Line No. | Query |
|---|---|
| 1. | SELECT SUM(Sales), Products |
| 2. | FROM SalesCube |
| 3. | WHERE Year in (2012, 2013) and |
| 4. | LOCATION in (Store.Address WITHIN 500m OF Feature ("park", "recreation center")); |

Table 3 depicts another example where a calculated expression is defined and the expression is not in the analytic but comes from the spatial layer. This expression brings in new data that will exist only for the duration of the query.

TABLE 3

| Line No. | Query |
|---|---|
| 1. | SELECT SUM(Sales), LOCATION (Feature ("park", "recreation center")) AS SportsAreas |
| 2. | FROM SalesCube |
| 3. | WHERE Year in (2012, 2013) |
| 4. | LOCATION in (Store.Address WITHIN 500m OF Feature ("park", "recreation center")); |

In some example implementations, spatial stacking may be implemented in query 250. Spatial Stacking refers to generating a complex query in which a spatial context is stacked on top of another spatial context. This may enable a construction of a complex spatial query by combining ("stacking") the simple spatial contexts together. The complex spatial query may then be sent from user interface 210 to backend database 260 and the like for processing. Intermediate results from the stacking may be available for consumption by user interface 210, the query itself, as well other business intelligence tools. To illustrate, a query may be include spatial stacking in order to perform feature selection first on the feature "Park," and then apply a geometric computation "Buffer" on the selected park to compute and select all points inside the 500 meter buffer area around the park. Another example, a query may include spatial stacking in order to perform a buffer computation on all selected parks, and perform a quad-tree space partition on the buffer. Table 4 below depicts an example of the previous query example. Specifically, the query assigns values to the spatial stacking at for example lines 9-40. In this example, the geometry for the query is defined as a polygon having the values at lines 16-20, a buffer of 500 meters at lines 24-30, and a quad-tree is defined at lines 32-40. The query portion at lines 41-106 includes the assigned spatial stacking geometry.

TABLE 4

| Line No. | Query |
|---|---|
| 5. | SAE: { |
| 6. | map: { |
| 7. | srid: 'WGS84' |
| 8. | }, |
| 9. | spatialContexts: [{ |
| 10. | id: 'g01', |
| 11. | type: 'geometry', |
| 12. | data: { |
| 13. | "class": "Polygon", |
| 14. | "values": [ |
| 15. | [ |
| 16. | [100.0, 0.0], |
| 17. | [101.0, 0.0], |
| 18. | [101.0, 1.0], |
| 19. | [100.0, 1.0], |
| 20. | [100.0, 0.0] |
| 21. | ] |
| 22. | ] |
| 23. | }, |
| 24. | }, { //spatial stacking |
| 25. | id: 'b01', |
| 26. | target: '@g01', |
| 27. | type: 'buffer', |
| 28. | data: { |
| 29. | range: '500', |
| 30. | unit: 'm' |
| 31. | } |
| 32. | }, { //spatial stacking |
| 33. | id: 'p02', |
| 34. | target: '@b01', |
| 35. | type: quadtree', |
| 36. | data: { |
| 37. | condition: ' = sum(data) < 10' |
| 38. | } |
| 39. | } |
| 40. | ], |
| 41. | queries: [{ |
| 42. | spatialContext: "@b01", |
| 43. | cellsDim: { |
| 44. | axisType: "subQuery", |
| 45. | components: [{ |
| 46. | marksDim: { |
| 47. | axisType: "spatial", |
| 48. | components: [{ |
| 49. | analyticType: "dimension", |
| 50. | id: "VM_ID", |
| 51. | key: { |
| 52. | id: "VM_ID" |
| 53. | }, |
| 54. | shape: "LOC" |
| 55. | } |
| 56. | ] |
| 57. | }, |
| 58. | marksNum: { |
| 59. | axisType: "numerical", |
| 60. | components: [{ |
| 61. | analyticType: "measure", |
| 62. | id: "SALES", |
| 63. | key: { |
| 64. | id: "SALES" |
| 65. | }, |
| 66. | aggregationType: "sum" |

TABLE 4-continued

| Line No. | Query |
|---|---|
| 67. |              } |
| 68. |            ] |
| 69. |           } |
| 70. |         } |
| 71. |       ] |
| 72. |     } |
| 73. |   }, { |
| 74. |     spatialContextTarget: "@p02", |
| 75. |     cellsDim: { |
| 76. |       axisType: "subQuery", |
| 77. |       components: [{ |
| 78. |         marksXNum: { |
| 79. |           axisType: "categorical", |
| 80. |           components: [{ |
| 81. |             analyticType: "dimension", |
| 82. |             id: "DAY_TYPE", |
| 83. |             key: { |
| 84. |               id: "DAY_TYPE" |
| 85. |             } |
| 86. |           } |
| 87. |           ] |

TABLE 4-continued

| Line No. | Query |
|---|---|
| 88. |         }, |
| 89. |         marksYNum: { |
| 90. |           axisType: "numerical", |
| 91. |           components: [{ |
| 92. |             analyticType: "measure", |
| 93. |             id: "SALES", |
| 94. |             key: { |
| 95. |               id: "SALES" |
| 96. |             }, |
| 97. |             aggregationType: "sum" |
| 98. |           } |
| 99. |           ] |
| 100. |         } |
| 101. |       } |
| 102. |       ] |
| 103. |     } |
| 104. |   } |
| 105. | ] |
| 106. | } |

Each spatial context may have a unique result topology. For example, a quad-tree corresponds to a tree, a hierarchy corresponds to a tree, a group corresponds to a set, and a topology corresponds to a node-edge list, so each embedded query may be attached to one or more of these structures. For example, in the quad-tree case, the analytic query is attached to a leaf, so result sets can be traversed. For topology, the analytic query is attached to a node-edge list.

The following provides an example use case incorporating the query and spatial context information disclosed herein. Sam is a Vancouver-district product manager responsible for overseeing all 10,000 vending machines in the Lower Mainland of Vancouver. Sam's goal for the year is to increase sales in the district by 10%. Sam is given a budget for installing additional 200 vending machines. Sam wonders where to install new vending machines. Considering that the new vending machines represent 2% of the overall install base, Sam expects to get only proportional increase in revenue. Thus, Sam needs to figure out where to get additional 8% of revenue increase. Sam considers a hybrid strategy of analyzing vending machines with low sales areas and either relocating them (or adjusting the product mix) or increasing the number of vending machines in the areas where machines run out of stock quite regularly. Sam is presented with an analytic view of sales data for all vending machines in the Lower Mainland of Vancouver. An example of this analytic view is depicted at Table 5.

TABLE 5

| Field | Field view type | Field database type | Description |
|---|---|---|---|
| VM_ID | attribute | INTEGER | ID of a vending machine. |
| LOC | attribute | ST_POINT | Coordinates of a vending machine. |
| DAY_TYPE | attribute | STRING (values: weekday, weekend) | Day of week category for facts. |
| PRODUCT_TYPE | attribute | STRING | Categories of products sold by a vending machine. |
| SALES | measure | DECIMAL (12, 4) | Sum of sales, in $$. |
| OUT_OF_STOCK | measure | REAL | Sum of time duration when a vending machine is out of stock. |
| QUANTITY | measure | INTEGER | Sum of sales, in items (e.g., ## of soda cans, chip bags). |

Figure 3:
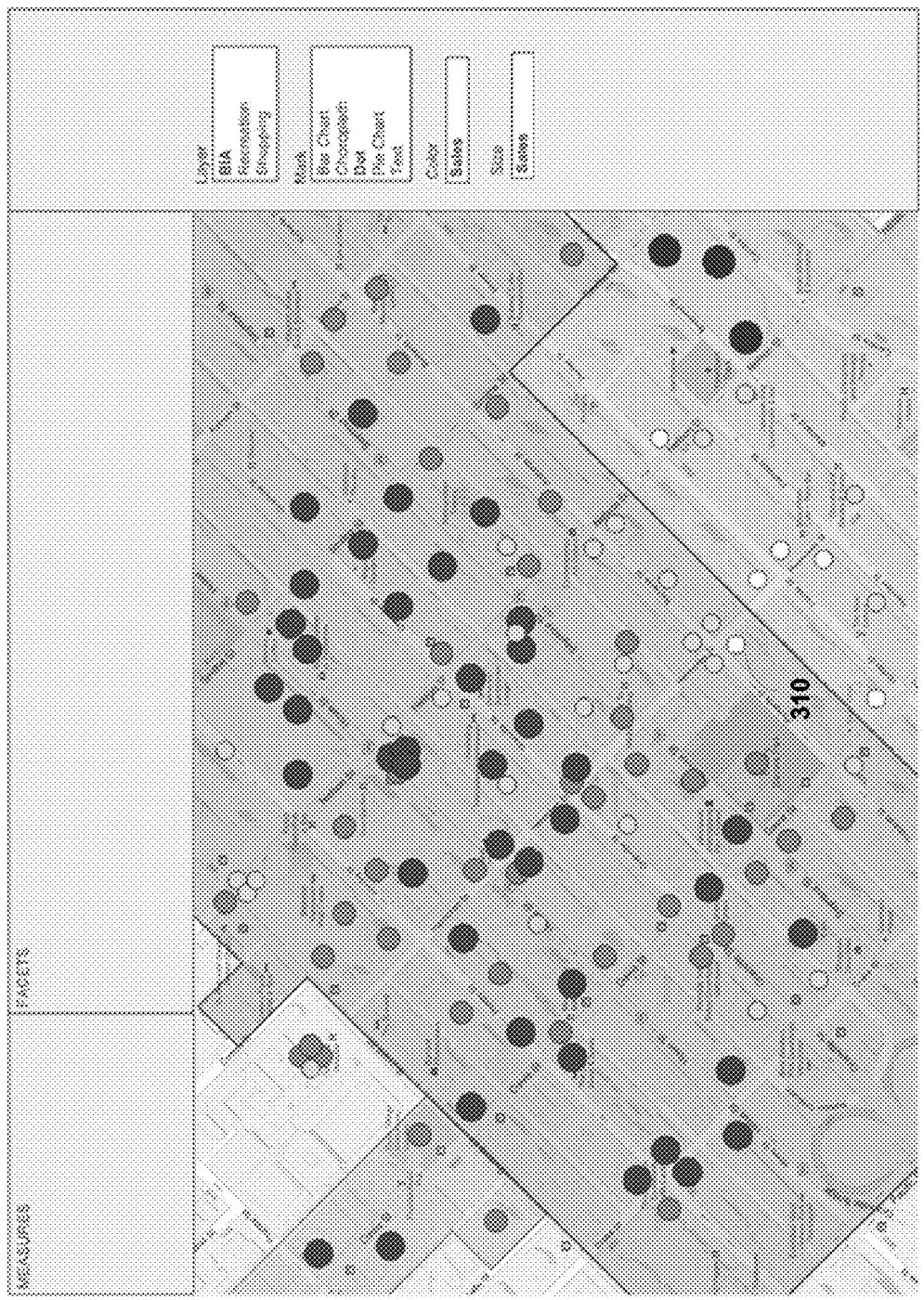
FIG. 3 depicts an example of a user interface presented in connection with a query containing spatial context, in accordance with some example implementations.

To determine which vending machines have low sales, Sam may initiate a query to find out which vending machines have the lowest sales. Sam looks at sales information for the first vending machine he found. The vending machine is located in the Vancouver downtown at the intersection of Helmcken and Richards streets. A map may then be generated to show where the vending machine is located in Downtown Vancouver Business Improvement Area, which is very close to the border with Yaletown Business Improvement Area. FIG. 3 depicts an example of the user interface 210 including the map and the vending machine 310. Table 6 below depicts an example of the query used to calculate sales by a location within the selected area (a rectangle) in Vancouver Downtown.

TABLE 6

| Line No. | Query |
|---|---|
| 1. | SAE: { |
| 2. |   map: { |
| 3. |     srid: "WGS84" |
| 4. |   }, |
| 5. |   spatialContexts: [{ |
| 6. |     id: "g01", |
| 7. |     type: "geometry", |
| 8. |     data: { |
| 9. |       class: "Polygon", |
| 10. |       values: [ |
| 11. |         [ |
| 12. |           [−123.13082, 49.27482], |

TABLE 6-continued

| Line No. | Query |
|---|---|
| 13. | [−123.13082, 49.28138], |
| 14. | [−123.11691, 49.28138], |
| 15. | [−123.11691, 49.27482], |
| 16. | [−123.13082, 49.27482] |
| 17. | ] |
| 18. | ] |
| 19. | } |
| 20. | } |
| 21. | ], |
| 22. | queries: [{ |
| 23. | spatialContext: "@g01", |
| 24. | cellsDim: { |
| 25. | axisType: "subQuery", |
| 26. | components: [{ |
| 27. | marksDim: { |
| 28. | axisType: "spatial", |
| 29. | components: [{ |
| 30. | analyticType: "dimension", |
| 31. | id: "VM_ID", |
| 32. | key: { |
| 33. | id: "VM_ID" |
| 34. | }, |
| 35. | shape: "LOC" |
| 36. | } |
| 37. | ] |
| 38. | }, |
| 39. | marksNum: { |
| 40. | axisType: "numerical", |
| 41. | components: [{ |
| 42. | analyticType: "measure", |
| 43. | id: "SALES", |
| 44. | key: { |
| 45. | id: "SALES" |
| 46. | }, |
| 47. | aggregationType: "sum" |
| 48. | } |
| 49. | ] |
| 50. | } |
| 51. | } |
| 52. | ] |
| 53. | } |
| 54. | } |
| 55. | ] |
| 56. | } |

Figure 4:
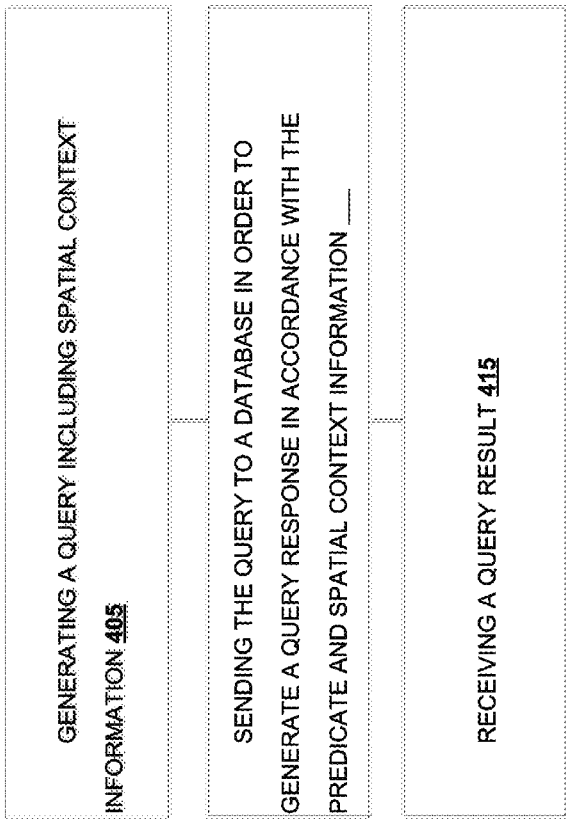
FIG. 4 illustrates a process for handling queries containing spatial context, in accordance with some example implementations.

FIG. 4 depicts an example process 400 for handling a query containing spatial context, in accordance with some example implementations. The description of process 400 also refers to FIG. 2.

At 405, a query including spatial context may be generated. A query, such as query 250, may be generated at user interface 210, and this query may include spatial context. The query may be structured to include a predicate for the query and the spatial context information. Moreover, the spatial context may include feature information and/or geometric information. The feature information may include, as noted, a term explicitly identifying a location. For example, the feature information may identify an administrative boundary, a political boundary, a continent, a country, a state, a province, a county, a city, a road name, a body of water, a river, a landmark, a pipeline, and/or a power grid. The geometric information may include a geometric shape, three-dimensional information, spatial location, a distance, a relative distance, and/or a direction. Moreover, the query may include a plurality of spatial context information stacked within the query. In some implementations, the query is generated at a user interface based on selection made at the user interface. The selections along with a query model and/or generator may form the query including the spatial context.

At 410, the query generated at 405 may be sent to a database in order to generate a query response in accordance with the predicate and spatial context information. For example, the query may include a predicate, such as "Sales" (see, for example, Table 2 at SELECT SUM(Sales), Products) and spatial context information, such as LOCATION in (Store.Address WITHIN 500 m OF Feature ("park", "recreation center"))" as shown at the pseudo-code of Table 2.

At 415, the database may send a response to the user interface. The response may provide the results of the query. Moreover, the results may be presented along with a graphical map. The query model is very expressive as it allows expressing in one single query what would otherwise take for example several SQL queries and additional code for pre- and post-processing. The proposed query model introduces several constructs (e.g., quad-tree partitioning) not available in database query languages and their extensions. The query processor, upon receiving a query, sends appropriate database queries to a database(s) and implement any necessary pre- and post-processing One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
    at least one processor; and
    at least one memory including computer program code which when executed by at least one processor causes operations comprising:
    generating a database query including a predicate for the database query and a plurality of spatial context information stacked within the database query to enable a first portion of the plurality of spatial context information to be used as an intermediate result for a second portion of the plurality of spatial context information, the database query providing an analytical query of a multidimensional database, at least one of the plurality of the spatial context information including feature information, geometric information, and a result topology, the feature information explicitly defining a location for the database query, the geometric information further defining, based on a data model, spatial context for the database query, the result topology defining a hierarchical structure for a result to the database query, wherein the result topology corresponds to the spatial context defined by the geometric information;
    sending the generated database query to a spatial query processor including the multidimensional database; and
    receiving, in response to the sent database query, a response comprising a multidimensional database query response generated in accordance with the predicate, the plurality of spatial context information, the feature information, the geometric information, and the result topology, wherein the response is presented with a map.

2. The system of claim 1, wherein the query is in accordance with java script object notation.

3. The system of claim 1, wherein the feature information identifies at least one of an administrative boundary, a political boundary, a continent, a country, a state, a province, a county, a city, a road name, a body of water, a river, a landmark, a pipe line, or a power grid.

4. The system of claim 1, wherein the geometric information comprises at least one of a geometric shape, three-dimensional information, a spatial location, a distance, a relative distance, or a direction.

5. The system of claim 1, wherein the plurality of spatial context information is selected from the user interface.

6. A non-transitory computer-readable storage medium including computer program code which when executed at least one processor causes operations comprising:
    generating a database query including a predicate for the database query and a plurality of spatial context information stacked within the database query to enable a first portion of the plurality of spatial context information to be used as an intermediate result for a second portion of the plurality of spatial context information, the database query providing an analytical query of a multidimensional database, at least one of the plurality of the spatial context information including feature information, geometric information, and a result topology, the feature information explicitly defining a location for the database query, the geometric information further defining, based on a data model, spatial context for the database query, the result topology defining a hierarchical structure for a result to the database query, wherein the result topology corresponds to the spatial context defined by the geometric information;
    sending the generated database query to a spatial query processor including the multidimensional database; and
    receiving, in response to the sent database query, a response comprising a multidimensional database query response generated in accordance with the predicate, the plurality of spatial context information, the feature information, the geometric information, and the result topology wherein the response is presented with a map.

7. The computer-readable storage medium of claim 6, wherein the query is in accordance with java script object notation.

8. The computer-readable storage medium of claim 6, wherein the feature information identifies at least one of an administrative boundary, a political boundary, a continent, a country, a state, a province, a county, a city, a road name, a body of water, a river, a landmark, a pipe line, or a power grid.

9. The computer-readable storage medium of claim 6, wherein the geometric information comprises at least one of a geometric shape, three-dimensional information, a spatial location, a distance, a relative distance, or a direction.

10. The computer-readable storage medium of claim 6, wherein the plurality of spatial context information query is selected from the user interface.

11. A method comprising:
    generating a database query including a predicate for the database query and a plurality of spatial context information stacked within the database query to enable a first portion of the plurality of spatial context information to be used as an intermediate result for a second portion of the plurality of spatial context information, the database query providing an analytical query of a multidimensional database, at least one of the plurality of the spatial context information including feature information, geometric information, and a result topology, the feature information explicitly defining a location for the database query, the geometric information further defining, based on a data model, spatial context for the database query, the result topology defining a hierarchical structure for a result to the database query, wherein the result topology corresponds to the spatial context defined by the geometric information;

sending the generated database query to a spatial query processor including the multidimensional database; and receiving, in response to the sent database query, a response comprising a multidimensional database query response generated in accordance with the predicate, the plurality of spatial context information, the feature information, the geometric information, and the result topology wherein the response is presented with a map.

12. The method of claim 11, wherein the query is in accordance with java script object notation.

13. The method of claim 11, wherein the feature information identifies at least one of an administrative boundary, a political boundary, a continent, a country, a state, a province, a county, a city, a road name, a body of water, a river, a landmark, a pipe line, or a power grid.

14. The method of claim 11, wherein the geometric information comprises at least one of a geometric shape, three-dimensional information, a spatial location, a distance, a relative distance, or a direction.

15. The method of claim 11, wherein the plurality of spatial context information is selected from the user interface.

* * * * *